United States Patent [19]

Wagner et al.

[11] 3,935,913
[45] Feb. 3, 1976

[54] PLATFORM WEIGHING SCALE

[75] Inventors: Herbert A. Wagner; Robert B. Katkov, both of Corona Del Mar, Calif.

[73] Assignee: Howe Richardson Scale Company, Clifton, N.J.

[22] Filed: Oct. 18, 1974

[21] Appl. No.: 515,855

[52] U.S. Cl. .................................. 177/134; 177/253
[51] Int. Cl.² ................. G01G 19/02; G01G 21/22
[58] Field of Search ...................... 177/134, 135, 253

[56] References Cited
UNITED STATES PATENTS

| | | |
|---|---|---|
| 3,533,481 | 10/1970 | Paelian ............................... 177/134 |
| 3,587,761 | 6/1971 | Merriam et al. .................... 177/134 |
| 3,679,011 | 7/1972 | Hawver ............................... 177/134 |
| 3,770,068 | 11/1973 | Ahl ..................................... 177/134 |

*Primary Examiner*—George H. Miller, Jr.
*Attorney, Agent, or Firm*—Norris & Bateman

[57] ABSTRACT

A platform weighing scale in which a reinforced load cell-supported platform structure has a framelike reinforcement cooperating with a load-receiving deck or platform to define a torsion box frame which resists load-induced deflection of the platform between spaced apart load cell support points.

17 Claims, 6 Drawing Figures

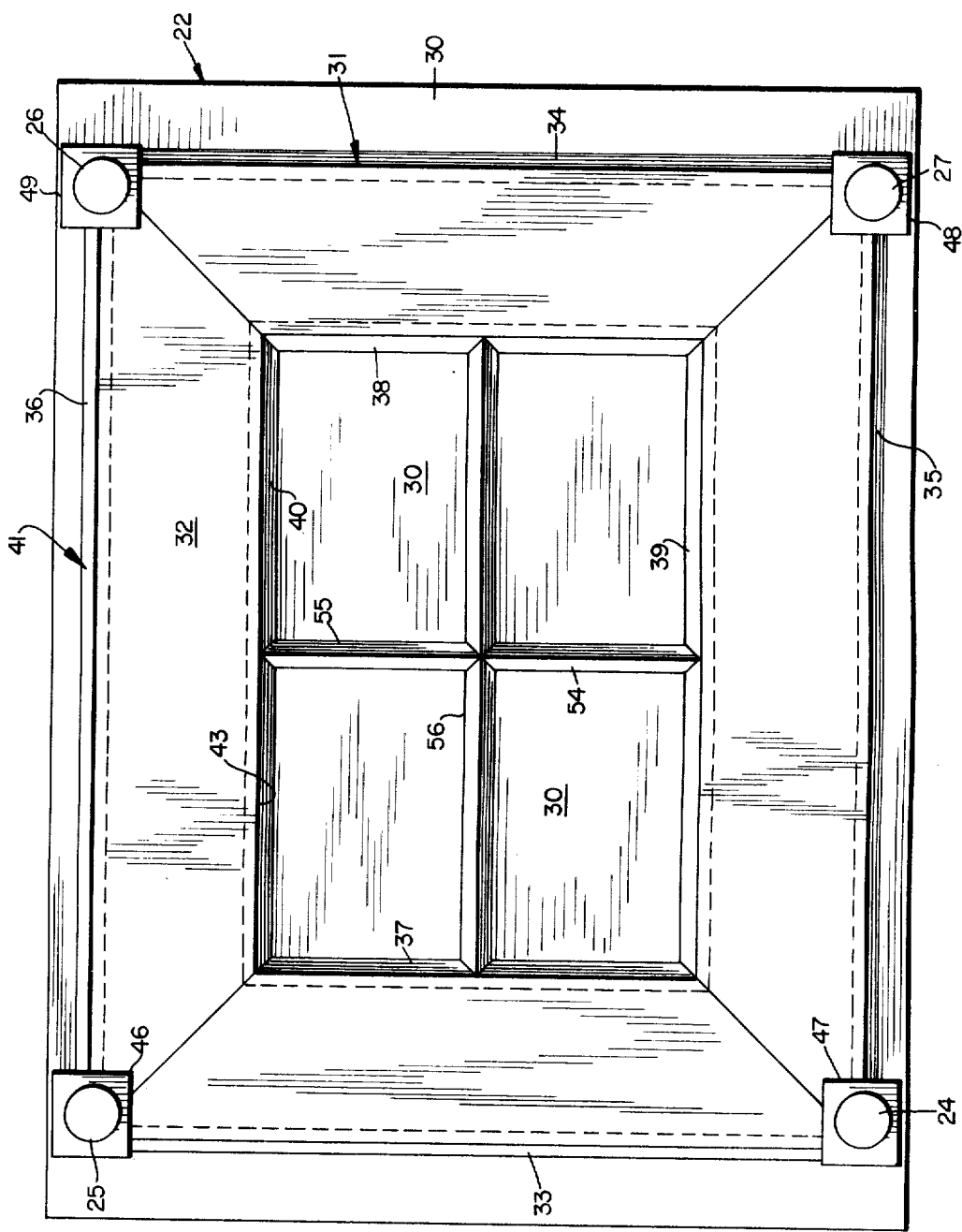

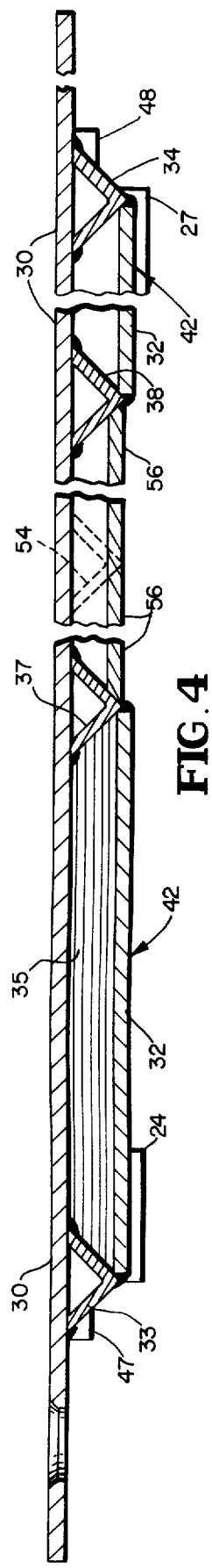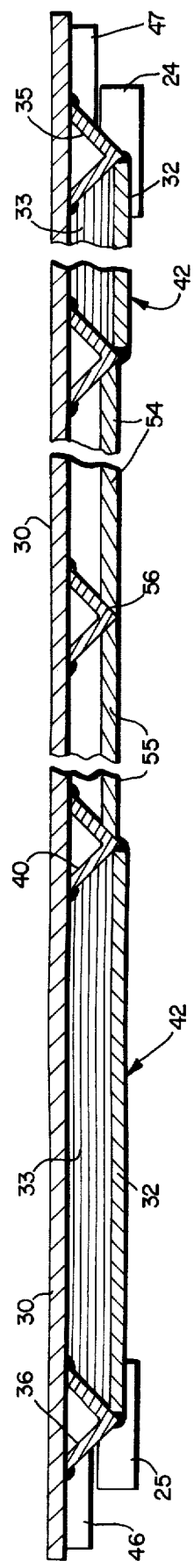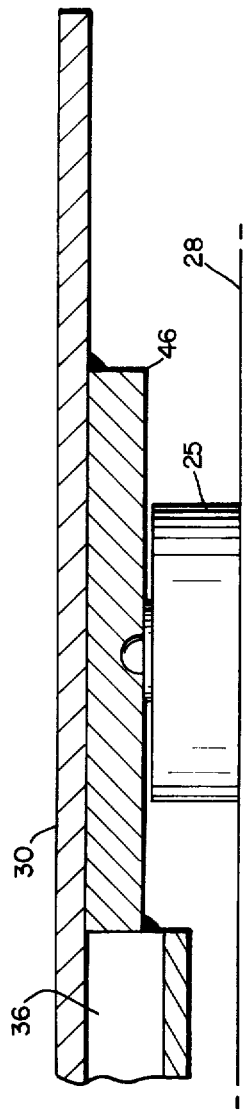

PLATFORM WEIGHING SCALE

FIELD OF INVENTION

This invention relates to platform weighing scales and is particularly concerned with platform structures which are especially suitably for low profile type platform scales.

BACKGROUND

Low profile platform scales for weighing relatively heavy loads are characterized by having a relatively small overall height as measured from the floor or other scale-support surface to the top of the load-receiving platform or deck. Scales of this type are especially suitable for weighing loads which are carted by such vehicles as tote bins, push carts, dollies, fork lift trucks and other usually relatively small motor vehicles.

Low profile type platform scales normally do not require installation in a pit to accommodate load-carrying vehicles and roll-on loads in general because the platform is relatively close to the floor surface and can easily be accessed by relatively short, gently sloped ramps. Thus, low profile type platform scales offer the significant advantage of pitless installation. On the other hand, in installations where it is desired to locate the platform flush with the floor surface, only a shallow pit is needed.

One of the stuctural features which contribute significantly to the floor-to-platform height of prior platform scales is the construction of the platform itself. Typically, the platform in prior scales is a relatively thick structural deck plate which is reinforced by several structural beams on the underside to minimize the deflection or sag of the platform under the influence of loads on the platform.

Load-induced deflection of the platform is objectionable in platform scales of the type in which the platform is supported on load cells because the deflection of the platform impairs the accuracy of weight measurements. When the platform deflects or sags under the influence of an applied load the supported corners of the platform curl up to effectively rotate over the load cells. As result, the force transferred by the platform to the load cell rotates away from a vertical line and out of axial alignment with the load cell. This force displacement results in the application of a horizontal force component to the load cell to side load the cell. Since load cells are usually incapable of measuring the horizontal component and since spurious output result from side-loading, the accuracy of the weight-indicating output voltage of the cell will be impaired to extent of the side loading.

The customary solution to this problem has been to make the deck plate thick enough and/or to make the deck plate reinforcement strong enough to minimize the deflection of the platform under the influence of applied loads. Such a solution, however, results in platform structures of increased height. It therefore is not compatible with the objective sought in low profile platform scales, namely the minimization of the height of the scale from the support floor to the load-receiving platform surface.

Another solution to the platform deflection problem is described in U.S. Pat. No. 3,587,761 which issued on June 28, 1971 to L. C. Merriam et al. This solution however, significantly increases the floor-to-platform height of the scale because it requires a special structure to be interposed between each load cell and the platform to avoid side loading of the cells.

The foregoing U.S. patent also illustrates a typical platform structure having a deck plate and reinforcing beams which are seated on the platform-supporting load cells. Other examples of prior weighing scales are shown in U.S. Pat. No. 3,103,984 which issued to C. L. Ellis et al on Sept. 17, 1963, U.S. Pat. No. 2,962,276 which issued to A. L. Thurston on Nov. 29, 1960, U.S. Pat. No. 3,679,011 which issued to I. M. Hawver on July 25, 1972 and U.S. Pat. No. 3,565,196 which issued to E. Laimins on Feb. 23, 1971.

SUMMARY & OBJECTS OF INVENTION

In the novel platform scale of this invention, the load-receiving platform structure is reinforced in such a manner that it has an extremely low overall height, but yet has a high degree of torsional rigidity to effectively resist load-induced deflection and rotation of the platform in the regions of the platform-supporting load cells without resorting to excessive deck plate thicknesses.

Accordingly, a major object of this invention is to provide a novel load cell platform scale in which the load-receiving platform or deck is reinforced in such a manner that it has an extremely low height, but yet affords a high degree of torsional rigidity to effectively resist load-induced deflection and rotation of the deck in the regions of the platform-supporting load cells.

Another important object of this invention is to provide a novel scale platform structure which is suitable for low profile platform scale applications and which is reinforced in such a manner to effectively resist deflection under the influence of an applied load.

In the illustrated embodiment of this invention, the foregoing objects are achieved by a horizontal framelike reinforcing structure which is positioned vertically below the load-receiving deck to underlie border regions of the deck and which is rigidly joined to the deck by reinforcing structural side members. This reinforcing structure cooperates with the deck to define in vertical cross section a torsion box arrangement which has a closed perimeter.

The upper and lower walls of the torsion box are spaced vertically apart and are respectively defined by the deck itself and the framelike reinforcing structure. The sides of the torsion box arrangement are closed by the above mentioned structural side members which are rigidly joined to the deck and to the framelike reinforcing structure.

With the foregoing construction, the internal shear flow developed by an applied load will be in opposite directions through the upper and lower walls of the closed box arrangement to create a torsion or twisting couple which resists load-induced deflection or sagging of the deck. In this way, curling and effective rotation of the corners of the deck in the regions of the load cells is resisted to minimize rotation of the load-induced forces which are transferred through the deck and applied to the load cells.

The maximum height of reinforced platform structure of this invention is from the bottom face of the framelike reinforcing structure to the upper load-receiving face of the deck. Since the deck and framelike reinforcing plate structure need only be spaced slightly apart to provide a torsion couple moment of sufficient magnitude, the overall height of the reinforced platform structure will be very small. The reinforced platform structure of this invention is therefore particularly suitable for low profile type platform scales.

Additionally, the arrangement of the reinforced platform structure with the platform-supporting load cells is such that the upper ends of the load cell force-receiving elements are each at a level which is higher than the lowest surface of the reinforcing structure. With this construction the overall height of the combined assembly of the load cells and the reinforced platform (as measured from the bottom faces of the load cells to the load-receiving deck surface) is less than the sum of the heights of the reinforced platform structure and one of the load cells.

With the foregoing in mind, a more specific object of this invention is to provide a novel combined load cell and reinforced load-receiving platform assembly wherein the load-receiving platform or deck is reinforced by a framelike structure which underlies border regions of the platform and which is rigidly joined to the platform by reinforcing structure to defined a boxlike arrangement in vertical cross section.

Another more specific object of this invention resides in the provision of a combined load cell and reinforced load-receiving platform assembly in which a novel reinforcing structure cooperates with the load-receiving deck or platform to define a torsion box frame in which torsion or twisting couples are developed by an applied load to resist sagging or deflection of the reinforced platform between its load cell support points.

Further objects of this invention will appear as the description proceeds in connection with the appended claims and below-described drawings.

DESCRIPTION OF DRAWINGS

FIG. 3 is a bottom plan view of the platform weighing scale shown in FIG. 1;

FIG. 4 is a section taken substantially along lines 4—4 of FIG. 1;

FIG. 5 is a section taken substantially along lines 5—5 of FIG. 1; and

FIG. 6 is a section taken substantially along lines 6—6 of FIG. 1.

DETAILED DESCRIPTION

Figure 1:
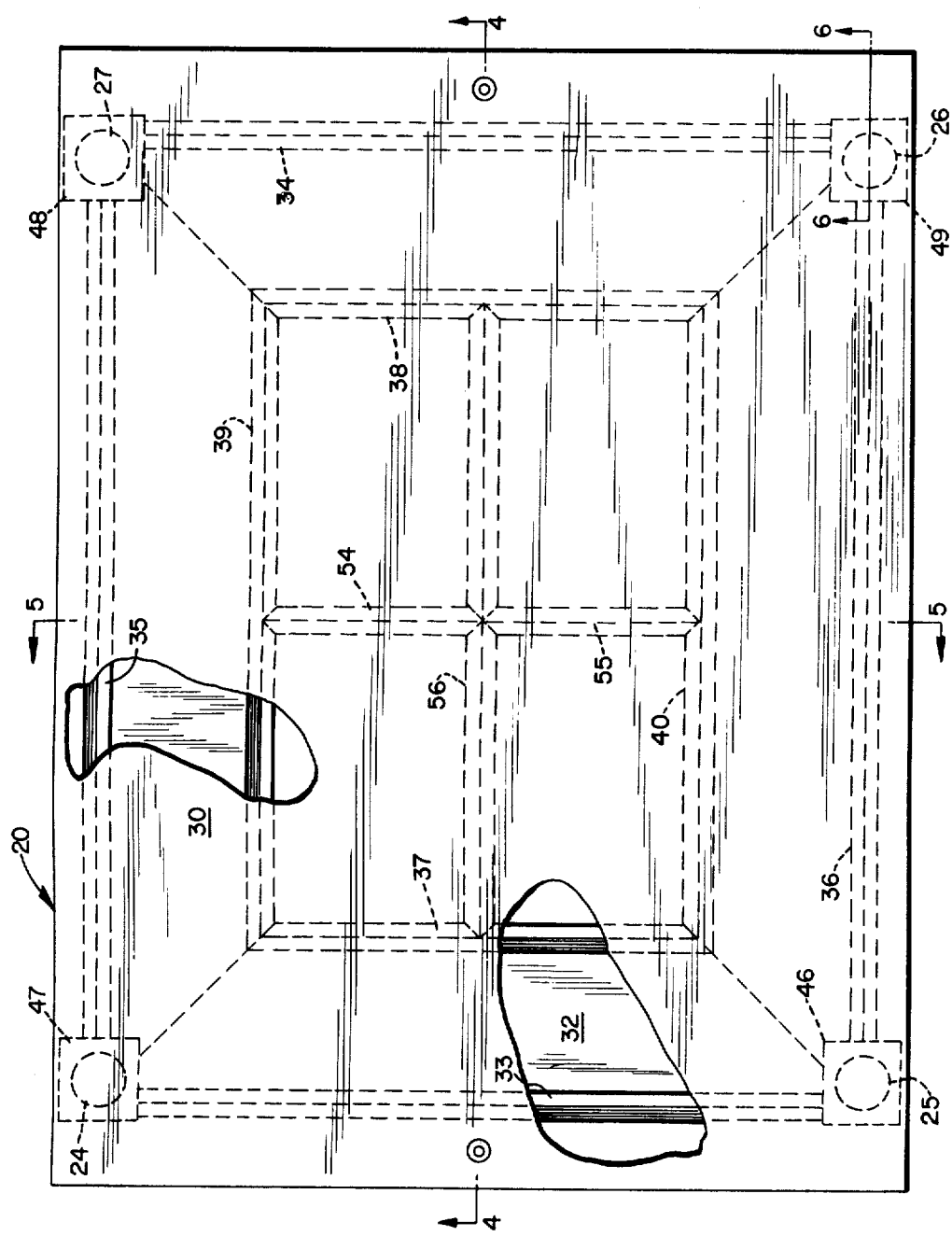
FIG. 1 is a top plan view of a low profile type platform weighing scale incorporating the principles of this invention.
Figure 2:
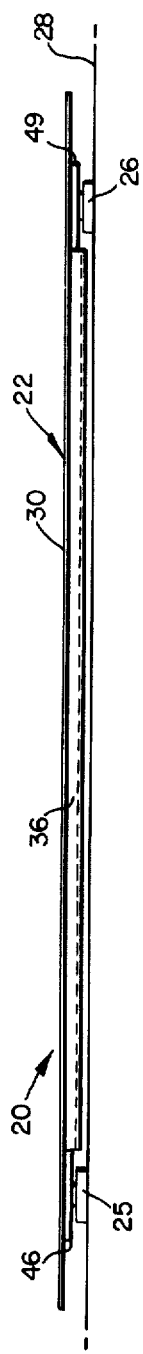
FIG. 2 is a side elevation of the platform weighing scale shown in FIG. 1.

Referring to the drawings and particularly to FIG. 1–3, a profile platform weighing scale incorporating the principles of this invention is generally indicated at 20 and comprises a reinforced load-receiving platform structure 22 and platform-supporting load cells 24, 25, 26 and 27. Platform structure 22 rests upon load cells 24–27 which are located at the platform corners. Cells 24–27 may be supported on a scale support floor surface 28.

Platform structure 22 comprises a rectangular load-receiving platform or deck 30 and a deck reinforcement which is generally indicated at 31. Deck 30 is flat-sided and may be formed from structural plates which are welded or otherwise rigidly joined together. Although a rectangular deck is shown in the embodiment, it will be appreciated that the principles of this invention may be employed to reinforce other deck configurations if desired.

One or more unshown ramps may be employed to provide access to deck 30 from floor surface 28. Alternatively, scale 20 may be located in a shallow pit if it is desired to position the deck's load-receiving surface flush with floor surface 28.

As shown in FIGS. 1 and 3–5, the deck reinforcement comprises of a horizontal framelike plate reinforcing structure 32 and a series of structural members 33, 34, 35, 36, 37, 38, 39 and 40 which cooperate with deck 30 to define a reinforcing torsion box frame 41. In vertical cross section box frame 41 forms a rectangular torsion box arrangement 42 (see FIGS. 4 and 5) which has a closed perimeter. The framelike reinforcing structure 32 may be formed from flat-sided structural plates which are welded or otherwise rigidly joined together in the form of a frame of rectangular configuration as best shown in FIG. 3.

Reinforcing structure 32 underlies and is parallel with deck 30. The outer side edges of reinforcing structure 32 are essentially parallel with the adjacent edges of deck 30 as shown. Structure 32 borders or delimits an unobstructed rectangular opening 43 as shown. Additionally, reinforcing structure 32 is centered relative to deck 30 and has outer dimensions which are somewhat smaller than deck 30 so that it lies completely inboard of the deck in spaced relation thereto. With this arrangement, deck 30 extends uniformly beyond reinforcing structure 32 along both of its sides and also uniformly beyond structure 32 along both of its ends.

As shown, box frame 41 has a framelike rectangular configuration in plan. In the vertical plane, the upper and lower parallel spaced apart walls of the closed torsion box arrangement 42 are respectively defined by deck 30 and reinforcing structure 32.

The sides of the torsion box arrangement are closed by structural members 33–40 which may be angle irons as shown or some other suitable structural configuration. Structural members 33–40 are rigidly joined, as by welding, to reinforcing structure 32 and to deck 30 on the underside thereof.

In the left-hand leg of box frame 41 as viewed from FIG. 1, the sides of the torsion box are closed by structural members 33 and 37 (see FIG. 4). In the right-hand leg of box frame 41 as viewed from FIG. 1, the sides of the torsion box are closed by structural members 34 and 38 (see FIG. 4). In one side leg of box frame 41, the sides of the torsion box are closed by structural members 35 and 39 as shown in FIG. 5, and in the other side leg of box frame 41, the sides of the torsion box are closed by structural members 36 and 40 as also shown in FIG. 5.

Referring back to FIGS. 1 and 3, structural members 33–36 are arranged with four load cell corner structures or retainers 46, 47, 48 and 49 to define an outer bordering frame 50 of rectangular configuration. Frame 50 extends around and is substantially contiguous with the outer edges of reinforcing structure 32 to define the outer side wall of box frame 41. Each of the retainers 46–49 may be a thick flat sided structural plate in block form.

As shown in FIG. 3, the ends of structural member 33 are rigidly joined, as by welding, to retainers 46 and 47, and the ends of structural member 34 are rigidly joined, as by welding, to retainers 48 and 49. Similarly, the ends of structural member 35 are rigidly joined, as by welding, to retainers 47 and 48, and the ends of structural member 36 are rigidly joined, as by welding, to retainers 46 and 49. With this construction, retainers 46–49 define the corners of frame 50.

Structural members 37–40 are rigidly joined together, as by welding, to form a rigid inner bordering frame 52 of rectangular configuration which extends along and is contiguous with the inner edges of reinforcing structure 32. Frame 52 defines the inner side wall of box frame 41.

The assembly of reinforcing structure 32 and members 33–40 reinforces the border regions of deck 30. The central region of deck 30, which lies vertically above opening 43, may be stiffened by structural members 54, 55 and 56. Members 54 and 55 extend perpendicularly between member 56 and side portions of frame 52. Members 54–56 are welded to the underside of deck 30 and are additionally rigidly joined, as by welding, to frame 52.

Retainers 46–49 are additionally rigidly fixed as by welding to deck 30 on the underside thereof and respectively overlie load cells 24–27. In this embodiment, retainers 46–49 have downwardly opening wells or holes which interfittingly receive and capture the force-receiving buttons of cells 24–27 respectively as shown, by way of example, in FIG. 6. Thus, in this embodiment, load cells 24–27 are confinent against horizontal movement relative to deck 30 by retainers 46–49. If desired, the corners of deck 30 may be noted out to receive retainers 46–49 in such a manner that the corners of the rectangular load-receiving deck surface are defined by the upper flat surfaces of retainers 46–49.

With the foregoing construction, platform structure 22 is supported on load cells 24–27. Cells 24–27 are positioned inboard and vertically beneath deck 30.

Cells 24–27 may be of any suitable conventional construction. For example, they may be of the low-profile pancake type as illustrated. Additionally, they may be hydraulic cells or electrical cells. In this embodiment, each of the load cells 24–27 is effective to produce a d.c. signal voltage whose magnitude is indicative of the load-induced force which is transferred through deck 30 and applied vertically to the load cells's force-receiving button in alignment with the load cell's longitudinal axis.

If the load applied to deck 30 causes platform structure 22 to deflect or sag between the load cell support points, the corners of platform structure 22 will curl up to cause the platform to effectively rotate about it regions of contact with the force-receiving buttons of the load cells. As a result, the force transferred to the load cell will rotate away from the load cell's vertical longitudinal axis by an angle which corresponds to the slope of the sagging or deflected platform structure. The rotated force, which is the true weight indication, will therefore have vertical and horizontal force components.

Conventional load cells of the type described herein are capable of measuring only those forces which are in alignment with the load cell's longitudinal axis. Therefore, cells 24–27 will each measure only the vertical component of the rotated force and not the horizontal force component which side loads the cell. Since the magnitude of the vertical force component is smaller than that of the rotated resultant force, the weight-indicating signal voltage supplied by the load cell will become smaller as the deck sags to provide an inaccurate weight measurement.

With this invention, however, box frame 41 provides platform structure 22 with a high degree of torsional rigidity to resist and thereby minimize load-induced sagging or deflection of platform structure 22 between the load cell support points. In this invention, the internal shear flow developed by an applied load will be in opposite directions through the upper and lower walls of the torsion box frame 41 (as indicated by the arrows in FIG. 4) to create a torsion couple in the torsion box. This internal torsion couple resists deflection or sagging of platform structure 22 under the influence of a load applied to deck 30 eccentrically of load cells 24–27. In this way effective rotation of the platform structure 22 in the regions of load cells 24–27 is resisted to minimize the rotation of the load-induced force which is transferred by deck 30 to each load cell.

The vertical spacing between deck 30 and reinforcing structure 32 and the thicknesses of deck 30 and structure 32 are not required to be very large in order to develop a torsion couple moment of adequate magnitude to effectively resist sagging or deflection of platform structure 22. In a 15,000 pound capacity low profile scale, for example, the vertical spacing between deck 30 and reinforcing structure 32 need only be about one inch and thickness of the structural plates which form deck 30 and reinforcing structure 32 need only be about ½ inch to provide platform structure 22 with enough torsional rigidity to minimize load-induced sagging or deflection of the platform.

Thus, the overall of maximum height of platform structure 22, which is measured from the bottom face of reinforcing structure 22 to the top load-receiving surface of deck 30 is relatively small. In the example of the 15,000 pound capacity scale mentioned above the overall or maximum height of platform structure 22 is only approximately 2 inches. The magnitude of the torsion couple moment developed in box frame 41 varies with the pre-selected vertical distance between deck 30 and reinforcing structure 22.

Additionally, the arrangement of load cells 24–27 with platform structure 22 is such that the upper end of each load cell is at a level which is vertically above the bottom face of reinforcing structure 32. Thus, the vertical dimension of each load cell overlaps the vertical height of platform structure 22 so that the overall height of the combined assembly of cells 24–27 and platform structure 22 (as measured from the bottom faces of cells 24–27 to the top load-receiving surface of deck 30) is significantly smaller than the sum of the heights of platform structure 22 and one of the load cells.

The present invention therefore provides a combined reinforced platform and load cell assembly which has a very low overall height for application in low profile type platform scales.

Although the reinforced platform structure of this invention is particularly suitable for low profile platform scales, it will be appreciated that it may be employed in other types of platform weighing scales.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A platform weighing scale comprising a multiplicity of load cells and a reinforced platform structure supported at spaced apart regions on said load cells, said platform structure including a load-receiving deck and deck reinforcing means fixed to the underside of said deck and cooperating with said deck to define a torsion box frame which resists deflection of said platform structure between said spaced apart regions, said torsion box frame having a perimeter which is defined by a multiplicity of leg portions, and each leg portion having two pairs of walls in which the walls of each pair are spaced apart from each other to define a quadrangular configuration in vertical cross section.

2. The platform weighing scale defined in claim 1 wherein one of the walls of one of said pairs of said walls is defined by said deck.

3. A platform weighing scale comprising a series of load cells and a reinforced platform structure supported at spaced apart points on said load cells, said reinforced platform structure including a horizontal load-receiving deck and structural reinforcing means rigidly joined to said deck on the underside thereof and cooperating with border regions of said deck to define a torsion box frame which has a boxlike configuration in vertical cross section, said boxlike configuration having a closed perimeter and being delimited by vertically spaced apart upper and lower walls which are respectively defined by said deck and a horizontal framelike portion of said structural reinforcing means, the internal shear flow developed in said box frame by application of a load to said deck being in opposite directions through said upper and lower walls respectively to provide a torsion couple which resists deflection of said platform structure between said spaced apart points.

4. The platform weighing scale defined in claim 3 wherein the lowest surface of said reinforcing means is defined by the bottom face of said framelike portion.

5. The platform weighing scale defined in claim 3 wherein the lowest surface of said reinforcing means is defined by the bottom face of said framelike portion, and wherein the upper load-receiving ends of said load cells are each at a level which is higher than said lowest surface.

6. The platform weighing scale defined in claim 5 wherein outer corners of said box frame are delimited by load cells retainers, each of said retainers being seated on the load-receiving element of one of said load cells to provide for the transfer of load-induced forces from said deck to said load cells.

7. The platform weighing scale defined in claim 3 wherein said box frame has inner and outer side walls, wherein said framelike portion is a horizontal rectangular plate structure having a central rectangular opening underlying the central region of said deck, and wherein said structural reinforcing means further includes inner and outer structural bordering frames rigidly joined to said plate structure and to said deck and respectively defining said inner and outer side walls.

8. The platform weighing scale defined in claim 7 wherein said inner and outer bordering frames are rectangular, and wherein the corners of said outer bordering frame are defined by corner structures, each corner structure being positioned over and seated on the force-receiving element of one of said load cells to provide for the transfer of load-induced forces from said deck to said load cells.

9. The platform weighing scale defined in claim 8 wherein upper ends of the load-receiving elements are each at a level which is higher than the bottom face of said plate structure, and wherein the bottom face of said plate structure is the lowest surface of said reinforced platform structure.

10. A platform weighing scale comprising a series of load cells and a reinforced platform structure supported on said load cells, said reinforced platform structure including a horizontal load-receiving deck, a horizontal reinforcing frame-like structure spaced vertically below said deck by a preselected distance, and reinforcing structural means located on the underside of said deck and rigidly joined to said deck and said framelike structure, said framelike structure cooperating with said structural means and border regions of said deck to define a boxlike arrangement in vertical cross section, said boxlike arrangement having a closed perimeter and being delimited by upper and lower vertically spaced apart walls which are joined by spaced apart side walls and which are respectively defined by said deck and said framelike structure, the internal shear flow developed by application of a load to said deck being in opposite directions through said upper and lower walls to resist load-induced deflection of said platform structure between the regions where it is supported on said load cells.

11. The platform weighing scale defined in claim 10 wherein said structural means comprises inner and outer bordering frames which respectively define said side walls.

12. The platform weighing scale defined in claim 11 wherein corners of said outer bordering frame are defined by structures which are fixed to said deck and which are seated one on each of the force-receiving elements of said load cells to provide for the transfer of load-induced forces from said deck to said load cells.

13. The platform weighing scale defined in claim 12 wherein the lowest surface of said reinforced platform structure is defined by the bottom face of said framelike structure, and wherein the upper end of the force-receiving element of each load cell is at a level which is higher than said lowest surface.

14. The platform weighing scale defined in claim 10 wherein the lowest surface of said reinforced platform structure is defined by the bottom face of said framelike structure.

15. The platform weighing scale defined in claim 14 wherein the upper end of the load-receiving element of each load cell is at a level which is higher than said lowest surface.

16. The platform weighing scale defined in claim 14 wherein said framelike structure is formed from at least one structural plate and defines an opening which underlies the central region of said deck.

17. The platform weighing scale defined in claim 16 wherein said framelike structure, said deck and said opening are each rectangular in shape, and wherein said opening is unobstructed.

* * * * *